(No Model.) 7 Sheets—Sheet 1.

F. H. RICHARDS.
FEEDING MECHANISM FOR PUNCHING PRESSES.

No. 378,805. Patented Feb. 28, 1888.

Witnesses
Geo. Wadman
Edgar Goodwin

Inventor
Francis H Richards
By his Attorney
Park Benjamin (No Model.)  7 Sheets—Sheet 2.

F. H. RICHARDS.
FEEDING MECHANISM FOR PUNCHING PRESSES.

No. 378,805.  Patented Feb. 28, 1888.

Witnesses
Geo. Wadman
Edgar Goodwin

Inventor
Francis H. Richards
By his Attorney
Park Benjamin (No Model.) 7 Sheets—Sheet 4.
F. H. RICHARDS.
FEEDING MECHANISM FOR PUNCHING PRESSES.
No. 378,805. Patented Feb. 28, 1888.

Witnesses
Geo. Wadman
Edgar Goodwin

Inventor
Francis H. Richards
By his Attorney
Park Benjamin (No Model.) 7 Sheets—Sheet 5.
F. H. RICHARDS.
FEEDING MECHANISM FOR PUNCHING PRESSES.
No. 378,805. Patented Feb. 28, 1888.
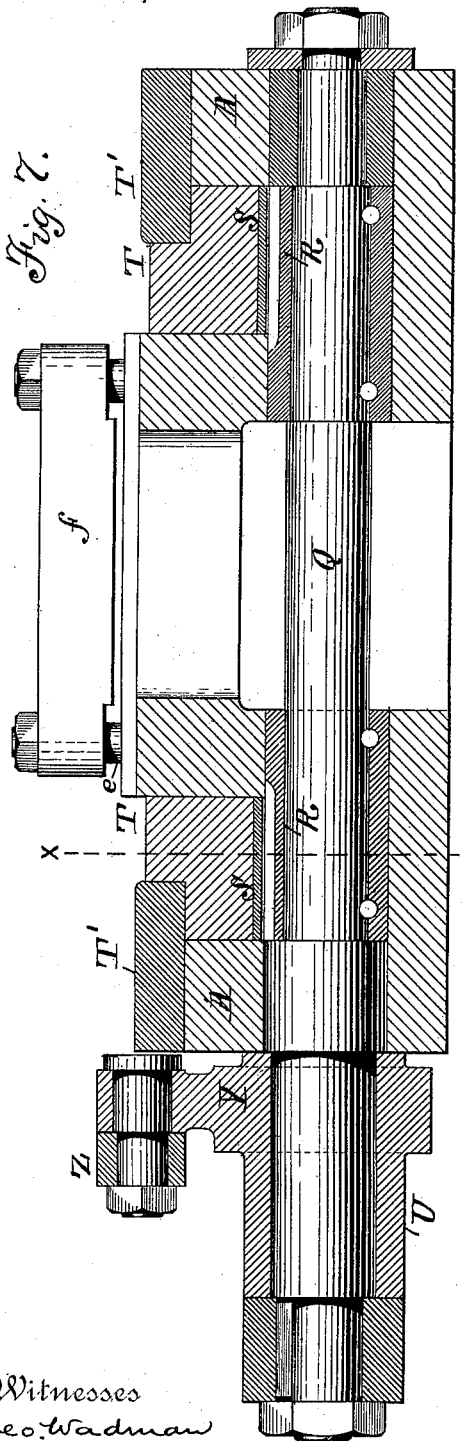
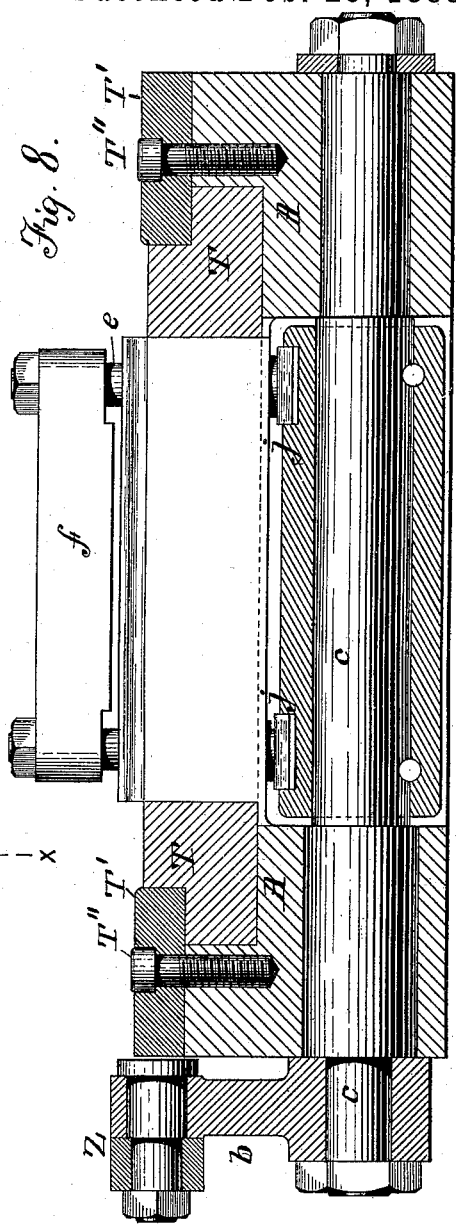
Witnesses
Geo. Wadman
Edgar Goodwin
Inventor
Francis H. Richards
By his Attorney
Park Benjamin (No Model.) 7 Sheets—Sheet 6.

F. H. RICHARDS.
FEEDING MECHANISM FOR PUNCHING PRESSES.

No. 378,805. Patented Feb. 28, 1888.

Witnesses.
Geo. Wadman.
Edgar Goodwin.

Inventor.
Francis H. Richards.
By his Attorney,
Park Benjamin.

(No Model.) 7 Sheets—Sheet 7.

F. H. RICHARDS.
FEEDING MECHANISM FOR PUNCHING PRESSES.

No. 378,805. Patented Feb. 28, 1888.

Witnesses.
Geo. Wadman.
Edgar Goodwin.

Inventor.
Francis H. Richards.
By his Attorney,
Park Benjamin.

UNITED STATES PATENT OFFICE.

FRANCIS H. RICHARDS, OF SPRINGFIELD, MASSACHUSETTS, ASSIGNOR TO THE MASON COTTON HARVESTER COMPANY, OF SOUTH CAROLINA.

FEEDING MECHANISM FOR PUNCHING-PRESSES.

SPECIFICATION forming part of Letters Patent No. 378,805, dated February 28, 1888.

Application filed February 17, 1887. Serial No. 227,981. (No model.)

*To all whom it may concern:*

Be it known that I, FRANCIS H. RICHARDS, of Springfield, Hampden county, Massachusetts, have invented a new and useful Improvement in Punching-Press Feeding Mechanism, of which the following is a specification.

My invention relates to mechanism for feeding metal sheets in punching-presses; and it consists in the combinations and instrumentalities hereinafter set forth, whereby the sheet to be punched is held and moved beneath the punches with great certainty and precision.

Figure 1:
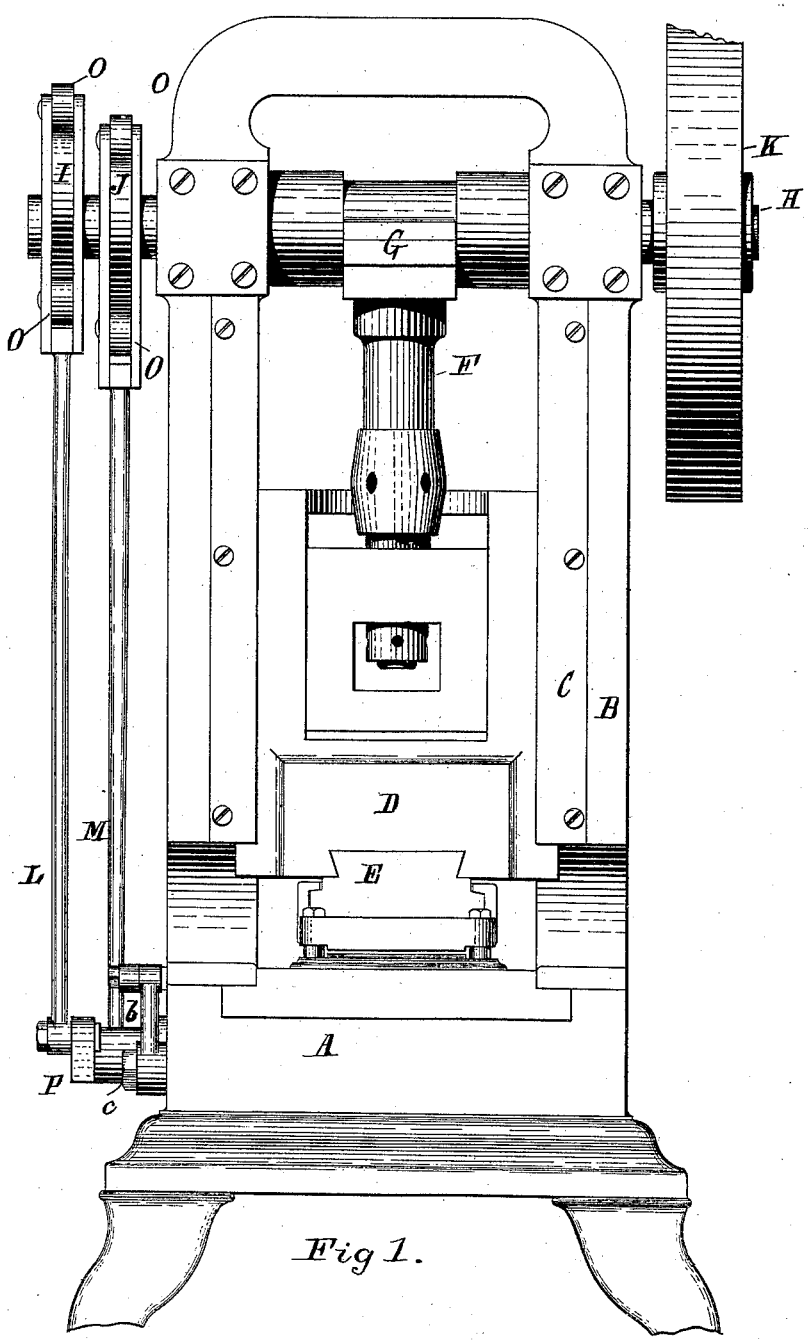
Figures 2, 3:
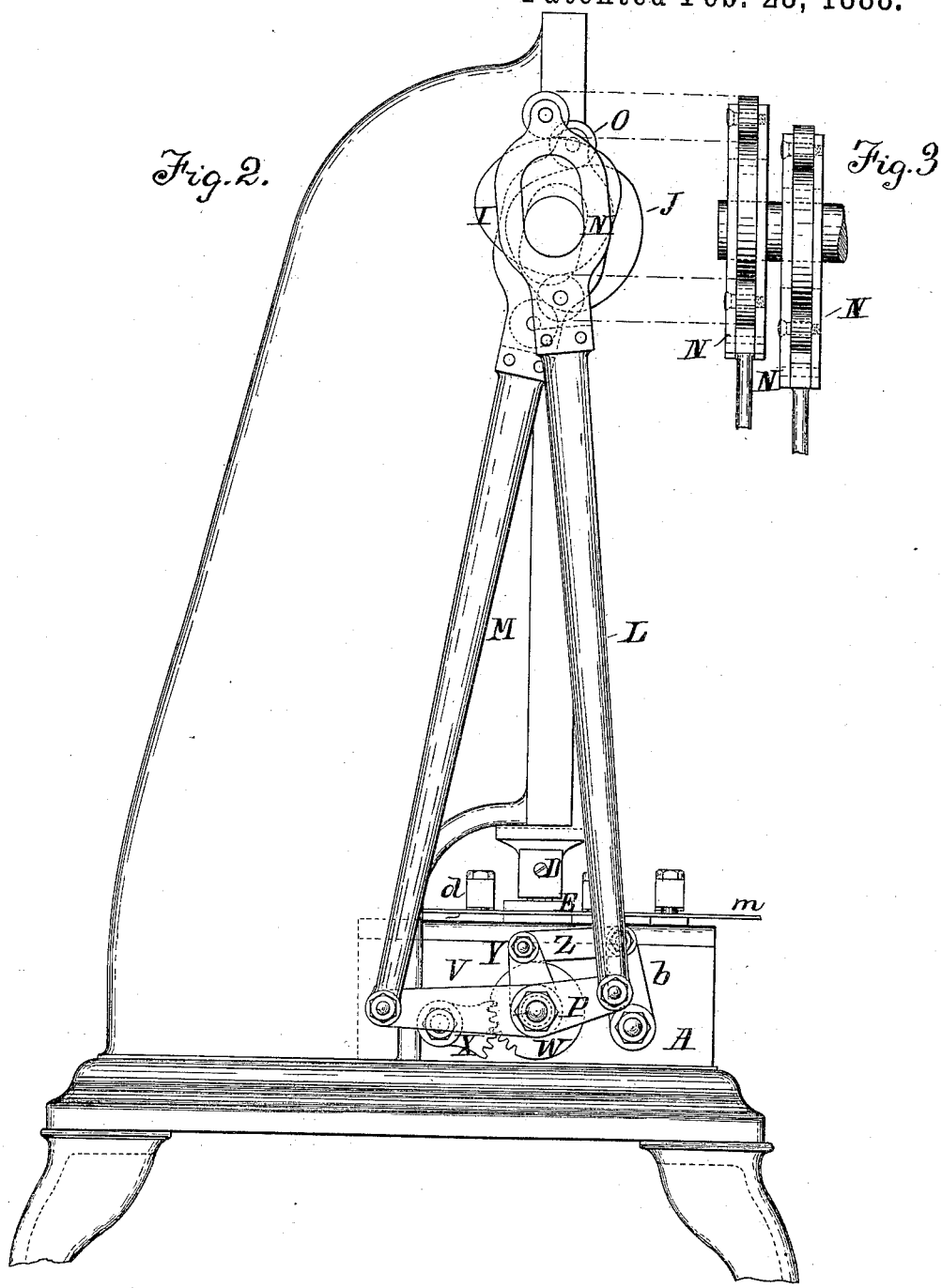
Figure 4:
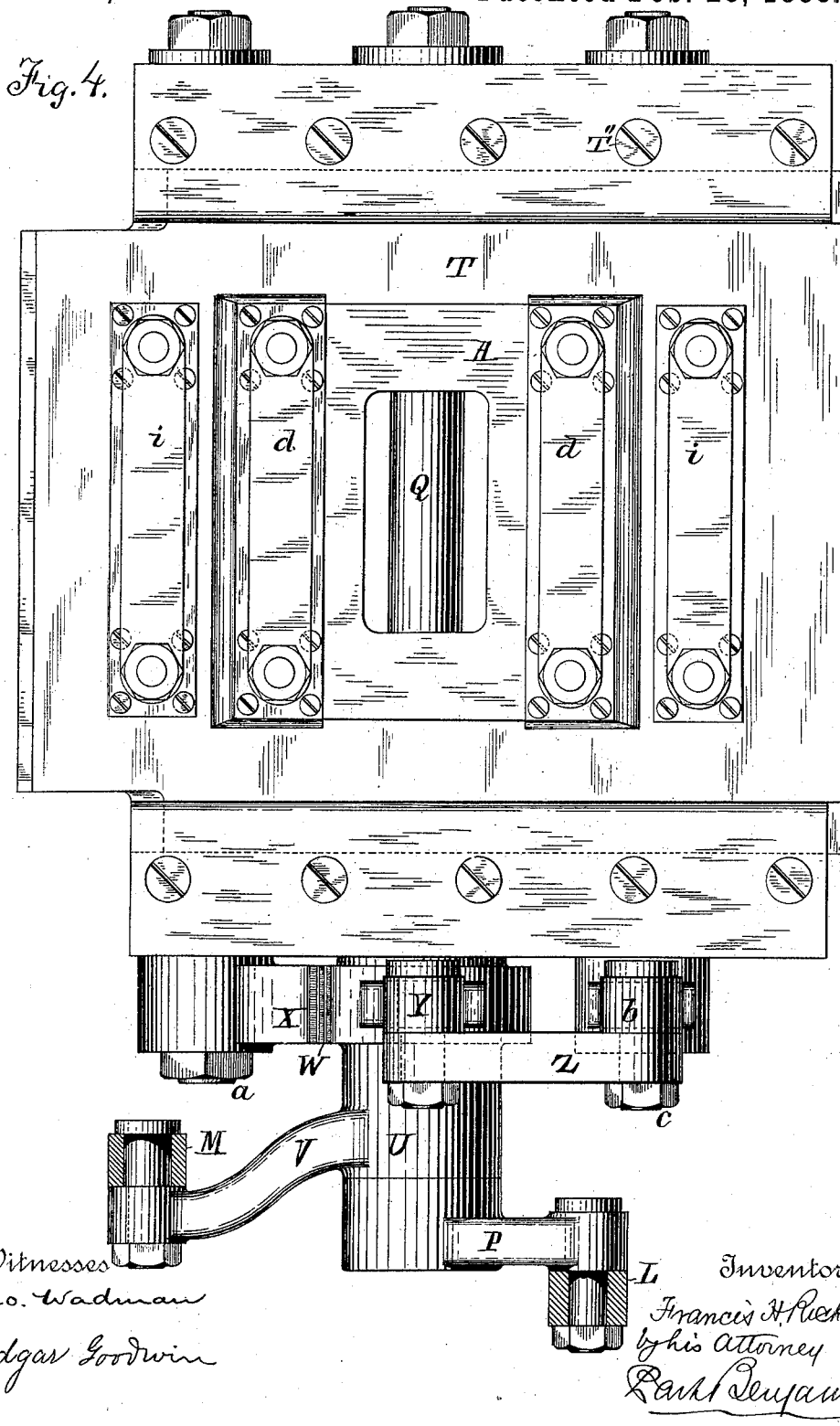
Figure 5:
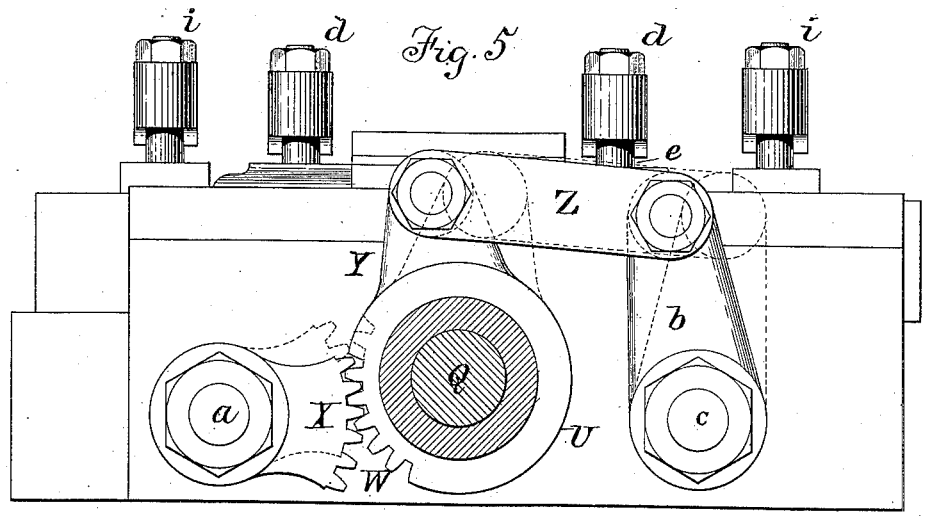
Figure 6:
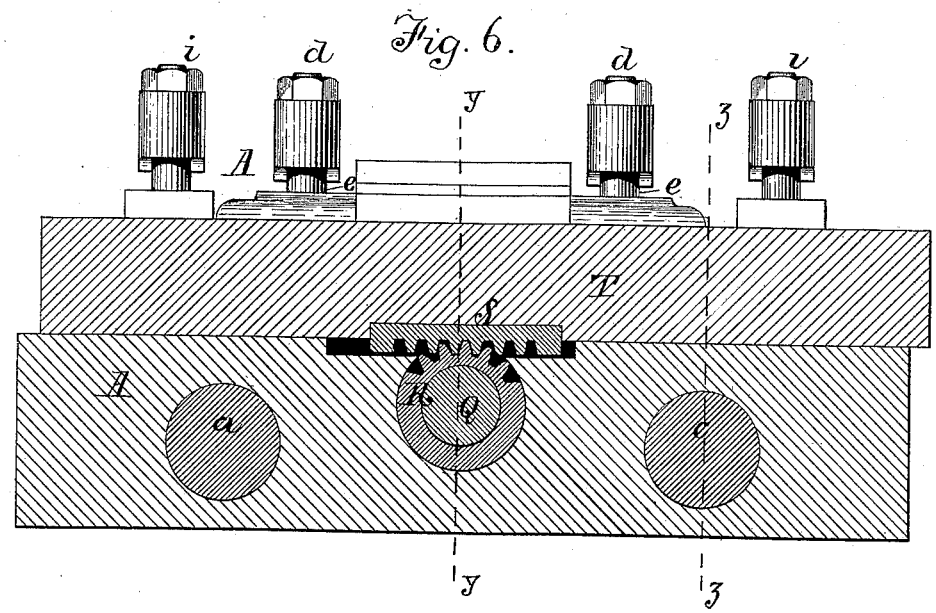

In the accompanying drawings, Figure 1 is a front elevation of an ordinary punching-press containing my improved feeding mechanism. Fig. 2 is an elevation of the left-hand side of said press. Fig. 3 is a front view of the actuating-cams drawn in projection with the same parts of Fig. 2. Fig. 4 is an enlarged top view of the frame and principal parts of the mechanism, the dies being removed. Fig. 5 is a left-hand end elevation of the feeding mechanism, the die being in place and certain portions broken away. Fig. 6 is a sectional elevation on the line $x\,x$ of Fig. 7. Fig. 7 is a vertical section on the line $y\,y$ of Fig. 6. Fig. 8 is a vertical section on the line $z\,z$ of Fig. 6. In these two figures shafts in line of the section are not shown in section. Figs. 9 to 14, inclusive, are a series of similar sectional views illustrating the operation of the feeding mechanism in six successive stages.

Similar letters of reference indicate like parts.

Referring more particularly to Figs. 1, 2, and 3, A is the bed of the machine.

B is the frame, on which are the ways C, in which moves the punching-slide D, carrying punches E. Said slide is actuated through its pitman F by an eccentric, G, on the transverse shaft H. Shaft H is provided at one end with a driving-pulley, K, and at its other end has two cams, I and J.

L and M are connecting-rods. At the upper end of each rod is a pair of straps, N, Figs. 2 and 3, which receive the shaft H. The cams I and J operate between said pairs of straps N and bear upon rollers O, journaled between said straps. By reason of the rotation of the shaft H, therefore, the cams I and J, acting upon the rollers O, actuate the connecting-rods L and M. The arrangement of the cams I and J is such that when one of said rods is elevated the other is depressed, and vice versa. The connecting-rod L actuates the feeding device whereby the work is moved forward beneath the punch. The connecting-rod M actuates the rock-shafts which control the clamps whereby the work is held during the operations of feeding and punching.

The connecting-rod L is pivoted to a crank-arm, P, on the shaft Q, which extends through the bed of the machine, Figs. 6 and 7. Upon said shaft are gears R, which engage with racks S on the lower side of the feed-slide T. Said slide rests in ways formed in the bed A, and has a central opening, so that it incloses the middle part of the bed, which comes immediately below the punches. Above the edges of the slide are plates T', secured in place by screws T'', said plates thus serving to keep the slide in place on its ways. The opening in the slide T is longer than the central part of the bed A, which enters said opening, so that said slide may be reciprocated on its ways by the vibration of the rock-shaft Q, transmitted through the gears R and racks S. Surrounding the shaft Q, and free to turn thereon, is a sleeve, U, provided with a crank-arm, V, to which arm is pivoted the connecting-rod M. Upon said sleeve is a segmental gear, W, which engages with another segmental gear, X, fast upon a rock-shaft, $a$, which extends across the bed of the machine parallel to the shaft Q; also upon the sleeve U is a crank-arm, Y, which is connected by a link, Z, with a crank-arm, $b$, upon the transverse shaft $c$, Fig. 8.

Figure 9:
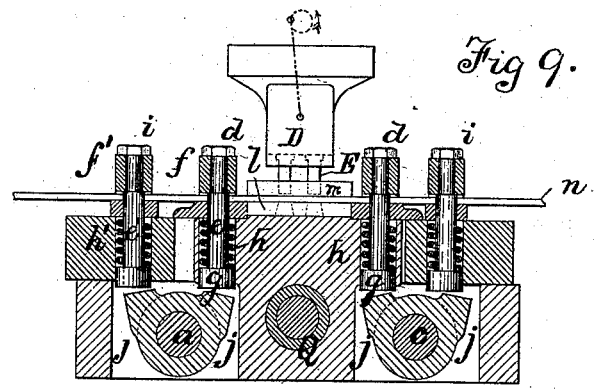

Passing through the middle portion of bed A, and on opposite sides of the punch, are holdfast-clamps $d$, which clamps consist of transverse bars $f$ and vertical rods $e$, which rods pass down through openings and are provided with heads $g$, Fig. 9. Surrounding said rods in said openings are coiled springs $h$, Figs. 8 and 9. Passing through the slide T are similar clamps, $i$, each clamp consisting of a transverse bar, $f'$, and rods $e'$, provided with heads similar to those of clamps $d$, and in like manner surrounded by coiled springs $h'$. Upon the rock-shafts $a$ and $c$ are lifting-cams $j$, disposed beneath the heads of the rods e and e', which support the bars f f'. Said cams are arranged on opposite sides of their supporting-shafts, so that when said shafts rock or vibrate in one direction the lifting-cams j will elevate, and so open or disengage the clamps d, and when said shafts rock or vibrate in the other direction said cams will elevate the clamps i.

The operation of the machine in detail can now be followed easily by the aid of Figs. 9 to 14. The punches E are shown in said figures in position in the punch-slide D. The pitman F is indicated by dotted lines and the direction of rotation of the shaft H by arrows. A suitable bed-die, l, is arranged beneath the punches, and above said bed-die is a stripper-plate, m. n is the sheet of metal to be punched, which travels beneath the several clamps and beneath the stripper-plate and punches.

Figs. 9 to 14 set forth the relative positions of the slide T, holdfast-clamps d, feed-clamps i, and punches E at various stages of the punching and feeding operation as follows:

In Fig. 9, first position: The punches are elevated, so that the sheet of metal to be punched is passed beneath them. None of the lifting-cams j are in contact with the vertical rods of the holdfast-clamps d or feed-clamps i; hence all of said clamps are held down by their springs and all four tightly grasp the work. The slide T is in its forward position.

Figure 10:
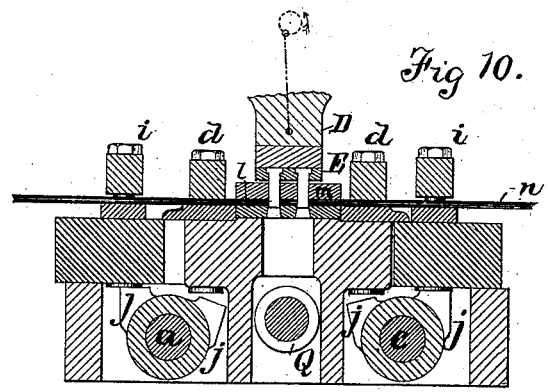

Second position, Fig. 10: The punches now descend, and as they do so the shafts a and c rotate, so as gradually to elevate the feeding-clamps i, while leaving the holdfast-clamps d, which are nearest the punches, still in action.

Figure 11:
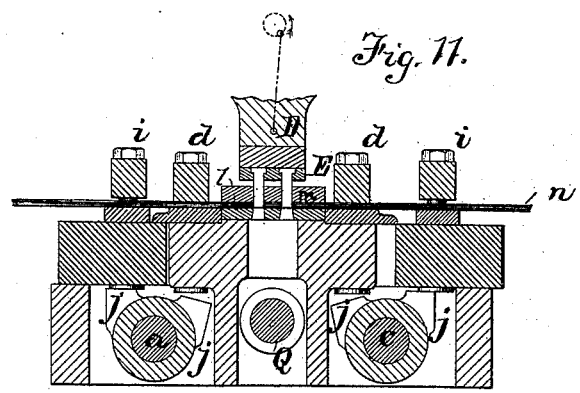

Third position, Fig. 11: The punches, having finished their stroke, now ascend. The holdfast-clamps d remain in action, retaining the work in place; but the feed-clamps i have been raised, so that the rotation of the shaft Q has caused the slide T to move rearward.

Figure 12:
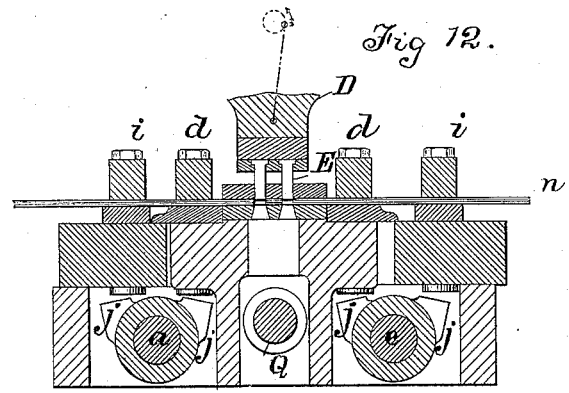

Fourth position, Fig. 12: The punches are still ascending. The feed-slide is at its rear position; but none of the lifting-cams j on the shafts a and c are in contact with the rods of the clamps, and hence all the clamps are down.

Figure 13:
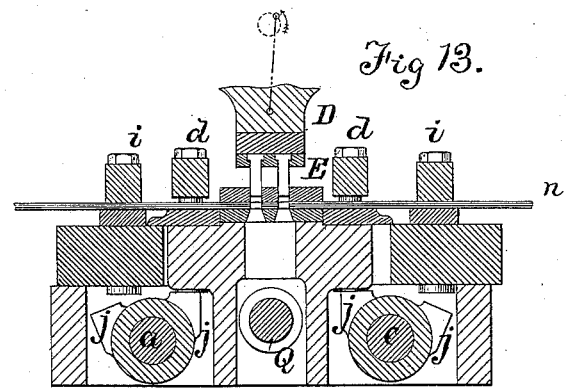

Fifth position, Fig. 13: The punches have now reached their highest point. The slide is still back. The shafts a and c have rotated so as to lift the holdfast-clamps, leaving the feed-clamps only in action. Now the work is about to be fed forward by the engagement of the gears R on shaft Q with the racks S on the slide T, and a new place on the surface of the sheet is brought beneath the punches.

Figure 14:
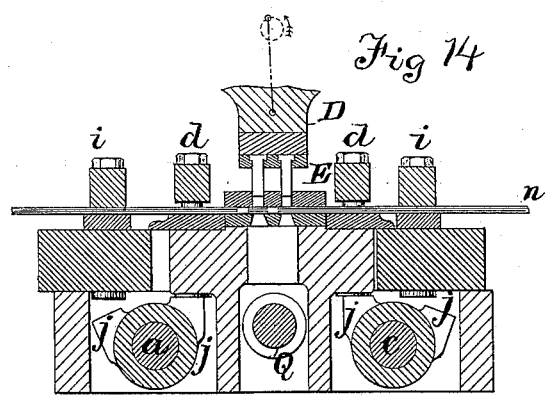

Sixth position, Fig. 14: Here the slide has moved forward. The feed-clamps are still down, and the punches are beginning to descend. The next stage is the first position shown in Fig. 9, and thus the cycle of operation is completed.

It will be apparent that by the above-described arrangement of mechanism the sheet during the time that it is in the press is always firmly held and supported. Reference to Figs. 9 and 12 will show that whenever the sheet is to be released by one set of clamps and grasped by the other set both sets first come into operation; hence at no time is the sheet left free. It will also be observed that the movement of the sheet is absolutely positive and determinate, whereby it becomes possible to govern the position of the punched apertures with accuracy.

I claim—

1. In a punching-press feeding mechanism, the combination of a fixed bed, a transverse slide on said bed, mechanism to reciprocate the same, a work-holding clamp attached to the bed, a similar clamp located on the slide, and mechanism to simultaneously release the movable jaw of one clamp and tighten the jaw of the other clamp, so that whether the work be moved forward by the transverse slide or remain motionless on the bed it shall be always gripped by one of the clamps, substantially as set forth.

2. In a punching-press feeding mechanism, the combination of a fixed bed, a horizontal transverse slide on said bed, mechanism to reciprocate the same, a work-holding clamp attached to the bed, a similar clamp located on the slide, and mechanism to simultaneously release the movable jaw of one clamp and tighten the jaw of the other clamp, so that whether the work be moved forward by the transverse slide or remain motionless on the bed it shall be always gripped by one of the clamps, substantially as set forth.

3. The combination of a vertically-reciprocating punch, a fixed bed beneath the punch, a transverse slide on said bed, mechanism to reciprocate the same, a set of work-holding clamps attached to the bed, a set of work-holding clamps located on the slide, and mechanism to simultaneously release the movable jaws of one set of clamps and tighten the jaws of the other set of clamps, so that whether the work be moved forward by the transverse slide or remain motionless on the bed it shall be always gripped by one set of the clamps, substantially as set forth.

4. The combination of a vertically-reciprocating punch, a fixed bed beneath the punch, a transverse slide on said bed, mechanism to reciprocate the same, a vertically-reciprocating work-holding clamp attached to the bed, a similar clamp located on the slide, and mechanism located beneath the upper surface of the bed to simultaneously release the movable jaw of one clamp and tighten the jaw of the other clamp, so that whether the work be moved forward by the transverse slide or remain motionless on the bed it shall be always gripped by one of the clamps, substantially as set forth.

5. The combination of a vertically-reciprocating punch, a fixed bed beneath the punch, the fixed bed being provided with a raised portion, a transverse slide on said bed, the slide being provided with a recess adapted to receive the raised portion of the bed, mechanism to reciprocate the slide, work-holding clamps attached to the bed, work-holding clamps located on the slide, and mechanism to simultaneously release the movable jaws of one set of clamps and tighten the jaws of the other set of clamps, so that whether the work be moved forward by the transverse slide or remain motionless on the bed it shall be always gripped by one of the clamps, substantially as set forth.

6. The combination of the bed A, the slide T, movable thereon, the vertically-movable clamps $i$ in said slide, provided with springs $h'$, rack S on said slide, rock-shaft Q, having gear R, engaging with said rack, movable clamps $d$ in said bed, provided with springs $h$, and rock-shafts $a$ and $c$, having lifting-cams $j$, acting upon said clamps, substantially as described.

7. The combination of the bed A, the slide T, movable thereon, the vertically-movable clamps $i$ in said slide, provided with springs $h'$, rack S on said slide, rock-shaft Q, having gear R, engaging with said rack, movable clamps $d$ in said bed and provided with springs $h$, rock-shafts $a$ and $c$, having lifting-cams $j$, acting on said clamps, segmental gear X on shaft $a$, sleeve U, having segmental gear W and crank-arms V and Y, link Z, crank-arm $b$ on shaft $c$, crank-arm P on shaft Q, and driving mechanism for vibrating said crank-arms P and V, substantially as described.

8. The combination of the bed A, the frame B, the shaft H, cams I and J on said shaft, connecting-rods L and M, actuated by said cams, crank-arms P and V, shaft Q, gear R on said shaft, slide T, rack S on said slide, vertically-moving clamps $i$ in said slide, provided with springs $h'$, sleeve U, segmental gear W on said sleeve, shaft $a$, segmental gear X on said shaft, crank-arm Y on said sleeve U, link Z, shaft $c$, crank-arm $b$ on said shaft $c$, vertically-moving clamps $d$ in said bed and provided with springs $h$, and lifting-cams $j$ on shafts $a$ and $c$, substantially as described.

FRANCIS H. RICHARDS.

Witnesses:
WILBUR L. BARNARD,
GEO. A. REYNOLDS.